SCANNING CONVERSION APPARATUS

Filed June 29, 1954 3 Sheets-Sheet 1

INVENTOR.
LOUIS PENSAK
BY
[signature]
ATTORNEY

May 6, 1958 L. PENSAK 2,833,958

SCANNING CONVERSION APPARATUS

Filed June 29, 1954 3 Sheets-Sheet 2

INVENTOR.
LOUIS PENSAK
BY
ATTORNEY

May 6, 1958 L. PENSAK 2,833,958

SCANNING CONVERSION APPARATUS

Filed June 29, 1954 3 Sheets-Sheet 3

INVENTOR.
LOUIS PENSAK
BY
[signature]
ATTORNEY

United States Patent Office 2,833,958

Patented May 6, 1958

2,833,958

SCANNING CONVERSION APPARATUS

Louis Pensak, Princeton, N. J., assignor to Radio Corporation of America, a corporation of Delaware Application June 29, 1954, Serial No. 439,973

The terminal fifteen years of the term of the patent to be granted has been disclaimed 8 Claims. (Cl. 315—12)

This invention relates to apparatus for converting from one set of scanning standards to another.

It is often useful to convert signals, such as television signals, which have been derived from scanning at a particular frequency to other television signals for use with television apparatus which scans at a different frequency. For example, there are many parts of the world in which the frequencies for scanning, both as to the field and line rate, and the number of lines forming the image, vary considerably from those which have been prescribed for use by the Federal Communications Commission for U. S. broadcast television purposes. In converting from some of those systems to the American standards, it is often possible to effect some synchronization between the respective rates, because of the fact that they bear a fixed ratio to one another. For example, if a system different from the U. S. operates at 25 frames per second, there is nevertheless a ratio of 5 to 6 so that the beginnings of the first frame of each system may be lined up. The present invention is useful for accomplishing conversion of these types of signals.

It is also possible to employ the present invention where the number of lines in each system are different. Furthermore, the present invention enables the conversion from a set of scanning standards which does not bear any relation to the U. S. system, such as the 5:6 ratio mentioned previously. It is convenient to term the latter the conversion of two "free-running" scanning systems.

An initial requirement for converting such free-running systems is a storage apparatus in which the stored information is not erased by the reading action. One type of such storage device is the "Metrechon" which has been described in an article appearing in the June 1954 issue of RCA Review entitled "The Metrechon—a new halftone picture storage tube" beginning at page 145. That article describes a double-ended storage tube with an insulator target and a writing screen grid of mesh situated a short distance away from the target. A writing electron gun forms a beam which is directed upon the target. Situated in contact with the target on its other side is another mesh screen. A reading electron gun forms an orthicon type of scanning beam. It is characteristic of this tube that once information has been written, scansion of it by the reading gun will not destroy the stored information. Therefore, the information may be preserved for relatively long periods of time. For many purposes, the "Metrechon" need have only a kinescope-type of scanning for the writing beam. For the purposes of this invention, however, it is preferable to employ a writing beam of the orthicon type in which the beam lands essentially perpendicularly on the target. Since the required storage device must be such that the reading action does not erase or destroy the stored information, some other method of erasure must be employed. The problem of finding such a method is further complicated by the fact that the writing and erasing should be such that no large portions of the stored picture are left blank, otherwise, when the reading beam scans the target it will produce an output signal wave which, when applied to a display device such as a kinescope, will produce a visible effect.

According to this invention, the set of signals to be converted is interspersed between recurrent pulses of erase energy. The writing beam is moved in a reciprocating manner as it scans the writing screen laterally. The writing beam is made first to erase information in its forward reciprocating position, then reverse its direction somewhat and write the new information. The beam then moves ahead again and erases another point and once again reverses to store new information in an area in proximity to the area in which the first unit of new information was applied. Each time the beam moves forward, a potential is applied to the writing screen to produce an erasing action. The writing beam movement is so adjusted that there is only a relatively small distance between the point at which the writing beam successively erases and writes new information. Special deflection apparatus may be required to alter the writing beam scan to provide the proper reciprocating motion. Such special apparatus may comprise an auxiliary deflection coil which is energized at the rate of which the video information is interspersed between pulses of erase beam current.

It is, therefore, an object of the present invention to provide a system for converting from signals produced by scanning at a given rate to signals which may be adapted for use with systems employing scanning rates different from said given rate.

Another object of the invention is to provide apparatus for conversion of one set of television signals to another.

Still another object of the invention is to provide a system whereby two free-running sets of signals may be rendered mutually convertible.

Still another object of the invention is to provide a scanning conversion system using a storage device of the "Metrechon" type so that the least visible annoyance is produced to the ultimate observer.

Other objects of the invention, as well as a more complete understanding of its operation may be obtained from the drawings, descriptions and the claims of this application.

Figure 1:
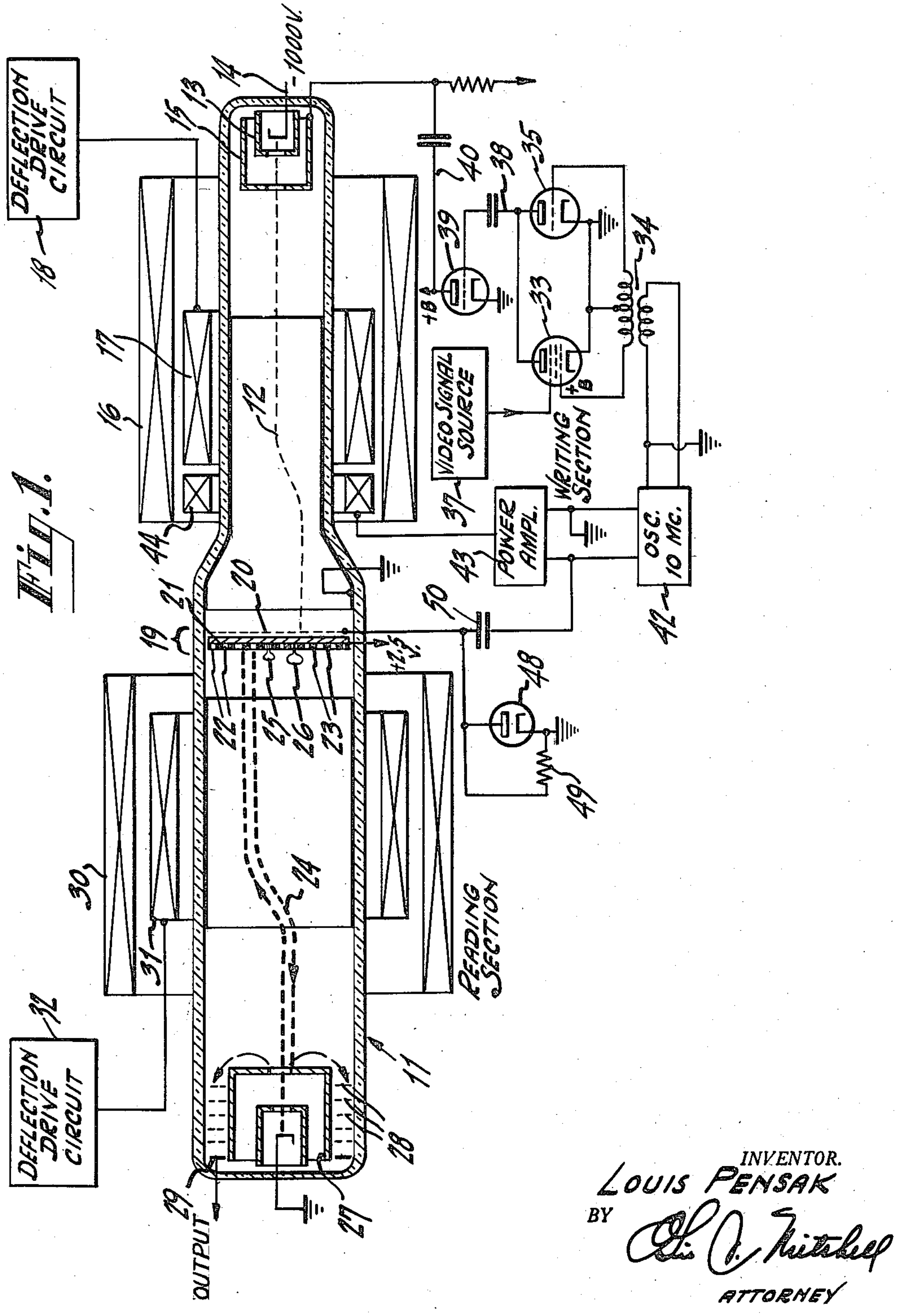
Figure 1 is a schematic and block diagram showing the invention in one of its forms.

In Figure 1 a schematic diagram of a "Metrechon" tube 11 is shown. In Figure 1 of the above mentioned RCA Review article a schematic outline of the "Metrechon" is also shown. In many forms the "Metrechon" contains a low velocity, orthicon type of reading beam and a high velocity cathode ray gun of the type used in conventional kinescopes. As shown in Figure 1 of this application, the writing beam 12 is of the type that lands perpendicularly upon the target. For the purposes of this application, the "Metrechon," in its modified form, is preferable inasmuch as a change in the writing screen potential does not cause a deflection of the beam spot due to the angle of approach of the writing beam. The perpendicular type of writing has the advantage of preventing difficulties in applications where it is desired to selectively erase and write at any point in response to the deflection system.

A brief description of the "Metrechon" 11 is helpful in explaining the operation of the present invention. The signal to be written is applied to a control grid 13 which intensity modulates the beam issuing from the cathode 14. The beam 12 is shaped by a screen grid 15 and is focused by the longitudinal coil 16. It is deflected by a coil 17 which is fed by appropriate driving pulses from deflection drive circuit 18. As the beam 12 approaches the target 19, it passes through writing screen 20 to which a potential is applied for the purposes of writing or erasing. It is to be remembered that both of these functions are performed on the writing section side of the "Metrechon" 11.

A charge pattern is established by the writing beam 12 on the writing surface of the dielectrical sheet 21. The writing beam 12 strikes the dielectric sheet 21 at energies sufficiently great to initiate secondary emission from the target surface greater than the primary beam current. If the writing screen 20 is maintained negative, the secondary electrons thus released will be driven back to the writing surface of the dielectric sheet 21 which drives that point of the sheet 21 negative. The current of the writing beam 12 is maintained at a small value so that as the beam is scanned from point to point the surface of the dielectric sheet 21 will be driven negatively on the order of about 5 volts for the maximum reading beam current. Since the writing beam 12 is modulated, other portions of the dielectric sheet 21 will be struck by less than the maximum beam current and will be driven negative to a correspondingly less degree.

When the dielectric sheet 21 is driven negative, corresponding zero equipotential lines are caused to appear within the interstices 22 of a fine wire mesh 23 which is sealed to the dielectric sheet 21 on the reading side of the tube. The greater the negative charge on the writing side of the sheet 21, the further will the zero equipotential lines extend out from the interstices 22 of the wire mesh 23. A low velocity reading beam 24 of the orthicon type is made to fall perpendicularly upon the mesh 23. However, its landing upon the mesh 23 will depend upon the strength of the electric field established by the charge pattern on the writing side of the sheet 21. Thus, if the zero equipotential lines are such that a small negative charge is on the sheet 21, as shown by zero equipotential line 25, a certain number of electrons in the reading beam will be repelled and will not land upon the mesh 23. If there is a greater negative charge as shown by the zero equipotential line 26, it will be seen that even fewer electrons will strike those portions of the mesh 23 adjacent the area of the sheet 21 on which such large negative charge exists. Consequently, the return beam will contain fewer electrons when the negative charge is small as compared with more electrons when the negative charge is larger. The return beam is reflected by the charge on grid 27 so that it falls upon a number of secondary electron emitting dinodes 28 where its current is increased and finally the amplified return beam current is collected at the output electrode 29. A longitudinal coil 30 establishes the focus of the reading beam 24 and deflection coil 31, supplied by driving pulses from deflection drive circuit 32, deflects the beam in the desired manner.

It is seen that since the reading beam return current is a function of the number of electrons which land on the mesh screen 23 or, stated in another way, the number of electrons which are reflected back by the mesh 23, the charge stored as shown by the equipotential lines 25 and 26, for example, will not be erased by the reading beam. For erasure of the stored information, the action of the writing screen 20 and the writing beam 12 are coordinated.

By making the potential applied to the writing screen 20 more positive, secondary electrons emitted by the impact of writing beam 12 are collected by the writing screen 20 and therefore whatever charge existed on the writing side of the dielectric sheet 21 is erased. Therefore, all that is necessary is that the screen 20 be raised to a more positive level and that either a particular area of the sheet 21, or the whole area, be scanned by the beam 12 when signal information is not applied to the control grid 13.

Enough of the structure and the operation of the "Metrechon" has been given above to enable one to understand the operation of the present invention with regard to it. In brief, the invention proposes to deflect the writing beam 12 such that it will move forward to erase, move backward a short distance and write new information and repeat the process line by line. Meanwhile, the reading beam 24 scans in a conventional manner, but in so doing does not discharge either the information currently being written by the beam 12, or the information written previously by the beam 12 in a different portion of the dielectric sheet 21.

Figure 2:
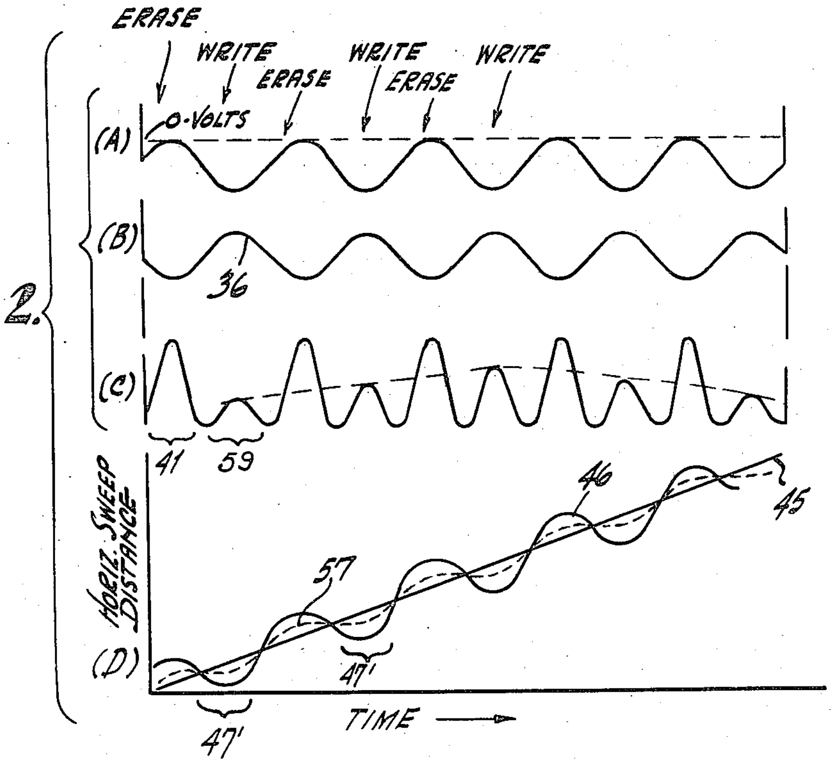
Figure 2 is a set of curves which illustrate the operation of the apparatus pictured in Figure 1.

Let us suppose for illustrative purposes that television signals according to British scanning standards are to be converted for use in American transmitters and receivers. In this case, deflection waves conforming to the British Standards will be applied to the coil 17 from a deflection drive circuit in response to British scanning rates, to deflect the beam 12 in appropriate fashion. The British composite video signal wave is applied to the suppressor grid of a pentode 33 from video signal source 37. It is sampled by applying a 10 mc. wave to the control grid of the pentode 33 via a transformer 34 whose secondary is center-tapped. The waveform of the sampling wave is shown as curve B of Figure 2. To the control grid of triode 35 a 10 mc. wave having opposite polarity to that of the wave applied to the control grid of pentode 33 is applied. It is shown in curve A of Figure 2. The polarity reversal is accomplished by the transformer secondary 34. Thus, whenever the grid of pentode 33 is positive as shown by point 36 of curve B, for example, the video signal from source 37 will appear at the combined output 38 of the pentode 33 and the triode 35. One such sample of the video signal from source 37 is shown by the portion 39 of curve C, which is the voltage at the point indicated by the numeral 40.

When it is desired that the beam 12 erase information a positive pulse of current shown as portion 41 of curve C appears at the output 40, because during this time the grid of triode 35 is positive which makes triode 35 conduct more current, whereas the grid of tube 33 is negative and therefore no sample of the video signal from a source 37 is taken. This positive pulse 41 is applied via the driving tube 39 to the control grid 13 of the writing gun. This positive pulse 41 is interspersed with the samples of video information such as sample 59 of curve C of Figure 2. The erase pulses can be turned off with respect to blanking at suitable intervals.

In order that the writing beam 12 does not erase and write successively in the same portion of the target the beam 12 may be deflected in a reciprocating manner. With the ordinary sawtooth deflection wave indicated by the straight line curve 45 of curve D of Figure 2, another portion of the 10 mc. waveform oscillator 42 is combined. This is accomplished by means of a power amplifier 43 to which the 10 mc. signal is applied from the oscillator 42. The output signal from the power amplifier 43 is applied to an inductor or deflection coil 44 to superpose the reciprocatory motion upon the linear line deflection provided by the coil 17. It is, of course, to be understood that the deflection coils 17 and 16 may be combined in a single unit and that the system illustrated and the waveforms utilized are but one method of performing the required function. The 10 mc. wave thus produces a curve as shown by numeral 46 of curve D. It is seen that the beam 12 is first advanced, then reversed, then advanced and reversed as the beam 12 is swept across any one line of the dielectric sheet 21. It may also be seen that each time the writing gun is pulsed with a positive pulse 41 of current that the beam 12 has just moved ahead. On the other hand, when the beam 12 has been reversed somewhat as shown by the segments 47 and 47' of the curve 46 of curve D, a portion of the video signals from source 37, represented by section 59 of curve C, is applied to the control grid 13. Thus, in every reverse position of the beam, video is laid down, whereas in every advance position of the beam the dielectric sheet 21 is erased. A diode 48 cooperates with resistor 49 and condenser 50 to produce a clamping action such that the writing screen 20 is not permitted to go above ground potential.

As the charge pattern is laid down on the writing side of the "Metrechon" 11, the reading section is also active. The beam 24 is deflected in response to signals applied from deflection drive circuit which might be American deflection signals for illustrative purposes. The deflection coil 31 acts upon the beam 24 to produce the desired movement. The return current of the beam 24 is amplified by secondarily-emissive dynodes 28 and finally collected by the output electrode 29. The return current will vary according to the charge pattern laid down on the writing side of the dielectric sheet 21.

Since American scanning standards call for 30 frames per second, whereas British scanning standards call for only 25, it is seen that the reading beam 24 may, at times, pass the writing beam 12.

Figure 3:
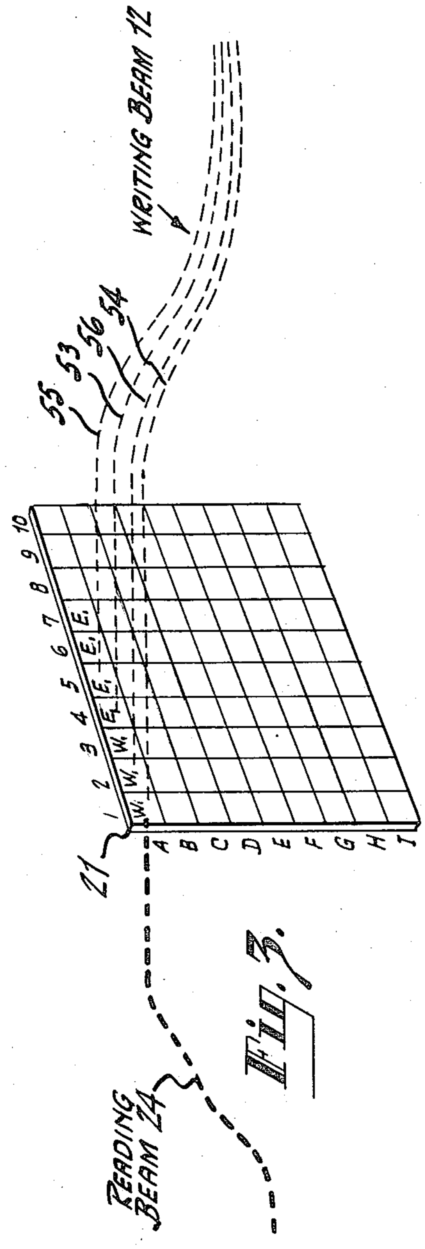
Figure 3 is a schematic representation of the scanning action of the invention in an image operating condition.
Figure 4:
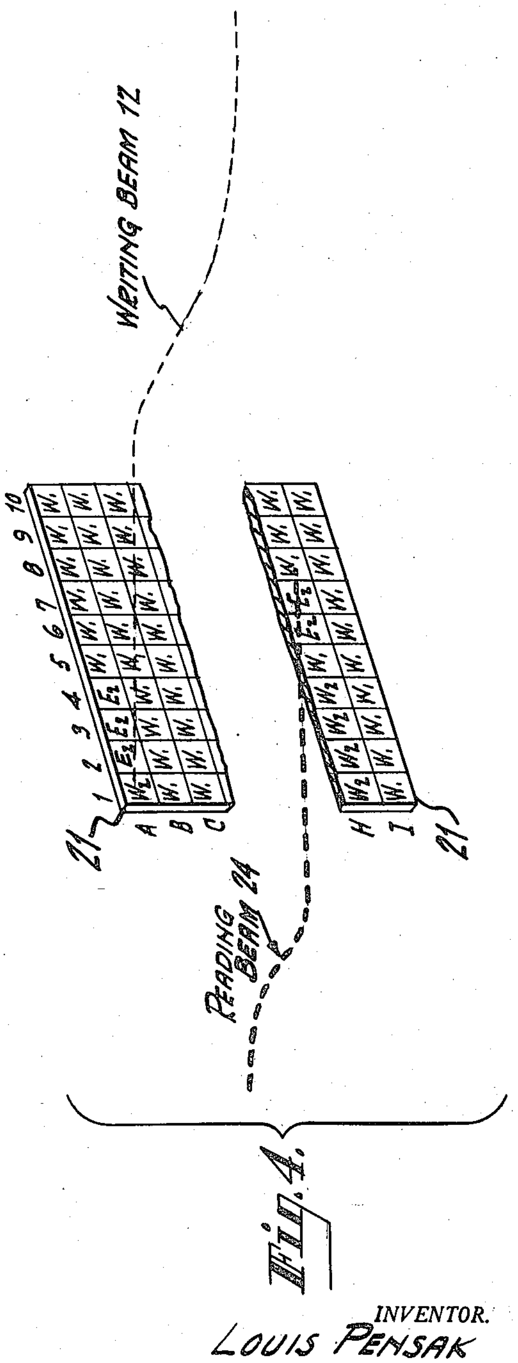
Figure 4 is a schematic diagram showing other conditions of operation.

The particular method of scanning of both beams is made more clear by reference to Figure 3, and Figure 4. Elemental areas of the charge pattern on the dielectric sheet of the target are shown schematically by the squares formed by the vertical and horizontal lines. A typical sequence of scanning for the writing beam 12 may be illustrated by the following. Let us assume that the position of the writing beam 12 is as shown by the numeral 53 so that it falls upon the elemental area A4 of the dielectric sheet 21. At this point a positive half-cycle such as the section 41 of curve C is applied and simultaneously the writing screen 20 is made positive so that any secondary electrons emitted will be collected and thus will cause that section of the dielectric sheet 21 to be erased. This condition may be indicated by filling the area A4 with the notation $E_1$ to show that it has been erased by the writing beam 12 when in position 53 during Field No. 1. The beam 12 then retraces a short distance to position 54 whereupon it falls upon area A1 at which point a portion 59 of the curve C may be applied and since the screen 20 is negative as shown by a negative half-cycle of curve A, a charge pattern corresponding to the amplitude of portion 59 will be established on the dielectric sheet 21. The beam then moves forward again to position 55 at which time it falls upon area A5 and erases. It then moves to position 56 where it writes again in area A2. This process is continued all along the lines A, B, C, etc. until the Field No. 1 has been laid down. At the same time that the charge pattern is being established by writing beam 12, reading beam 24 is also sweeping along line A and subsequently along lines B, C, etc. Since the reading beam 24 is deflected at a faster rate than the writing beam 12, the former will eventually pass the latter.

Figure 4 shows what happens in the next field and when the reading beam 24 passes an erased area in which no information has yet been written. Rows A, B and C show what may occur after one field has been written by the writing beam 12 as explained in connection with Field No. 1 and the second field has just begun to be written. Area A4 will be erased in Field No. 2 as indicated by the notation $E_2$. The writing beam then sweeps back to area A1 and writes the first element of Field No. 2 as indicated by the notation W2. The areas A2 and A3 have been erased by previous action of the writing beam at the very beginning of Field No. 2. Just at the moment when the area A1 has been written in with the first information element of Field No. 2, the pattern of the scansion on the sheet 21 is as shown in rows A, B, and C. It is to be noted that three conditions are present. Some new video information from Field No. 2 has been written in area A1. Information written in during Field No. 1, which formerly occupied areas A2 and A3, has been erased by the writing beam 12 during Field No. 2. However, since the writing beam has not yet been directed to any other of the squares, the information from the previous field is still written therein as indicated by $W_1$. At this point, the reading beam 24 has not yet passed the writing beam during the second field. However, it is likely to pass the writing beam toward the end of Field No. 2; i. e., around rows H and I. Thus, as shown, when the writing beam is made to fall upon H8 to erase the previous field information, the charge pattern on sheet 21 will be as shown. Areas H1, H2, H3 and H4 contain Field No. 2 information. Area H5 contains Field No. 1 information. Areas H6 and H7 have just been erased during Field No. 2. The remainder of the areas on rows H and I still contain information from Field No. 1. As the reading beam 24 sweeps to area H8 when the writing beam 12 has just finished writing in square H4, the reading beam 24 will indicate the erased information in areas H6 and H7 as an electrical signal, which will produce a black area in output display means. If the ratio of the signals to be converted is 5:6, this occurs only at the rate of the difference in the frame rates. Thus, the black area will be produced five times per second and its position will be different each time that it occurs due to the lack of synchronism between the reading and writing scans of the line rate as well as of the frame rate. Therefore, it occurs relatively infrequently and randomly and probably will not disturb the output picture to any great extent.

Inspection of Figure 4 also reveals that the reading beam in pasing over areas H4, H5, H6, H7 and H8 will successively scan a Field No. 2 video portion, a Field No. 2 erased portion, another Field No. 2 erased portion, and a Field No. 1 video portion in succession. Since these areas are relatively small and since there is a great deal of redundant information in the video signal for successive field, the mixture of first and second field signals in the output of the reading beam will not be noticeable. As a matter of fact, only a very small percentage of the information in successive video fields is new.

If it is desired to reduce the visibility, if any, occasioned by the scanning of an erased area intermediate two information areas, the deflection of the writing beam may be altered so that it may move ahead to erase a minimum distance from the point where it has just written. The waveform shown by curve 46 of curve D of Figure 2 will be changed accordingly to approach more nearly that of the dotted line wave 57. Here the amplitude has been decreased and as a result the beam sweeps forward just a relatively small distance and stays almost in the same place, and then reverses a minute amount to write before it moves ahead a short distance again for erasure. In a limiting case the curve 57 of Figure 2 may approximate a step wave so that the writing beam does not reverse at all, but moves forward, stops, erases, and then writes new information in the same place. This would tend to reduce to a minimum the visibility of the black area due to scanning by the reading beam of an erased area on the target.

Other types of storage devices which incorporate reflection modulation may also be adapted for use with this invention. In general, such tubes will have one beam for writing and erasing and another beam for reading the stored information. The reading beam in such other tubes does not erase, and thus information may be stored indefinitely until it is erased by the writing gun.

I claim:

1. A signal conversion system, comprising a signal storage device including a target, means providing an electron beam for scanning said target line by line at a predetermined rate for depositing a charge pattern on one side of said target in accordance with signal information derived in accordance with a first scanning standards, means for imparting a periodic discontinuous forward motion to said beam during each line scanning interval, means for causing said charge pattern depositing means alternately to erase information previously stored on said target during a first predetermined portion of the interval of said periodic discontinuous forward motion and to write information on said target in response to said first set of signals during a second predetermined portion of said interval of said periodic discontinuous forward motion, and means for scanning the opposite side of said target to read said deposited charge pattern in accordance with second scanning standards whereby a corresponding output wave is produced.

2. A signal conversion system, comprising a signal storage device including a target, means providing a first electron beam for scanning said target line by line at a predetermined rate and for depositing a charge pattern on one side of said target in response to a first set of signals derived in accordance with first scanning standards, means for imparting a reciprocating motion to said electron beam during each line scanning interval, said reciprocating motion having a repetition rate greater than said predetermined rate, means for controlling the potential of said beam in synchronism with said reciprocating motion such that said beam erases when in a forward position and writes when in a backward position, means including a second electron beam for scanning the opposite side of said target so as to read said charge pattern, and means for controlling said last named scanning means in accordance with second scanning standards, whereby to produce an output wave corresponding to said stored information in accordance with said second scanning standards.

3. A signal conversion system, comprising a signal storage device including a target, said target containing a dielectric sheet having first and second surfaces, a conductive grid in contact with said first surface, a foraminous electrode spaced from said second surface, means providing a first electron beam for scanning and depositing a charge pattern on said second surface, means for applying a first set of information signals derived in accordance with first scanning standards to said charge pattern depositing means for modulating said first electron beam, means for applying erase pulses to said charge pattern depositing means, said information signals and said erased pulses being applied to said depositing means in alternate mutually exclusive time intervals, means for deflecting said first electron beam across said target transversely line by line to provide a scanning raster as said charge pattern is deposited, means for imparting a periodic discontinuous forward motion to said beam during each line scanning interval, means for applying a potential to said foraminous electrode such that said beam erases during a predetermined portion of the interval of said periodic discontinuous forward motion in response to said erase pulses and such that it writes in response to said first set of information signals during a portion of the intervals of said periodic discontinuous forward motion different from said predetermined portion, means providing a second electron beam for scanning said deposited charge pattern, means for controlling said scanning means in accordance with second scanning standards whereupon said scanning means produces an output wave corresponding to said deposited charge pattern in accordance with said second scanning standards.

4. A signal conversion system, comprising a signal storage device, said device including a dielectric sheet having first and second surfaces, a foraminous electrode spaced from said first surface, a conductive mesh in contact with said second surface, means for establishing a charge pattern on said first surface corresponding to a first information signal wave which has been derived in accordance with a first set of scanning standards, said charge pattern establishing means including means for producing an electron beam and further including first means for deflecting said beam, means for energizing said first deflecting means so that said beam is deflected laterally and vertically in accordance with said first set of scanning standards, means for energizing said first deflection means so that said beam is caused alternately to advance and reverse as said beam is deflected laterally, means for applying an alternating voltage wave to said foraminous electrode in step with the advance and reversal of said beam, said charge pattern establishing means thereupon being alternately caused to erase and write said first information wave on said first surface as said beam is correspondingly advanced and reversed, means including second deflecting means for scanning said second surface of said dielectric sheet to produce a return beam of electrons corresponding to said established charge pattern, and means for energizing said second deflecting means in accordance with a second set of scanning standards whereby said return beam produces a second information signal wave conforming to said second set of scanning standards.

5. A signal conversion system comprising a double-sided signal storage device including a target and means for providing first and second electron beams adapted to impinge on first and second surfaces of said target, said first electron beam being adapted to write and erase information on said first surface of said target, said second electron beam being adapted to read information stored on said target as a result of the action of said first electron beam, said second electron beam being adapted to read stored information indefinitely without erasing it, first means for deflecting said first electron beam, said first deflecting means causing said electron beam to scan laterally and vertically, means for affecting said beam deflection during a lateral scanning interval to cyclically advance or retard the deflection of said beam as it is deflected laterally, means for applying a first information signal wave to modulate said first electron beam, said first information wave having been derived in accordance with a first set of scanning standards, means for adjusting the potential of said first electron beam to write a portion of said first information wave when said beam deflection is cyclically advanced and to erase when said beam deflection is cyclically retarded, means for deflecting said second electron beam, and means for energizing said second deflection means in accordance with a second set of scanning standards, whereby a second information signal wave is derived from said stored information in accordance with said second set of scanning standards.

6. A signal conversion system, comprising a signal storage device including a target, means for producing a writing electron beam, and means for producing a reading electron beam, each of said beams being adapted to impinge on opposite sides of said target, said target containing a dielectric sheet having first and second surfaces, a conductive grid in contact with said first surface of said dielectric sheet, a foraminous electrode spaced from said second surface of said sheet, a source of first information signals which have been derived in response to a first set of scanning signals, a source of an oscillatory wave, a first electron discharge device, means for applying said first information signals to said first electron discharge device, means for applying said oscillatory wave of given polarity to said first electron discharge device, a second electron discharge device connected in parallel with said first electron discharge device, means for applying said oscillatory wave in polarity opposite to said given polarity to said second electron discharge device, said first electron discharge device and said second electron discharge device thereupon producing an output wave containing samples of said first information signals interspersed with uniform amplitude pulses, means for modulating said writing beam by said output wave, means for applying said oscillatory wave in said opposite polarity to said foraminous electrode, first means for deflecting said writing beam, said first deflecting means being adapted to deflect said writing beam laterally and vertically, means for applying said oscillatory wave to said first deflecting means to impart back and forth motion to said writing beam as it is deflected laterally, said writing beam being adapted to store said first information signal samples when it is in a backward position, said writing beam being caused to erase previously stored information in response to said constant amplitude pulses when it is in a forward position, means for applying said first set of scanning signals to said first deflecting means, second means for deflecting said reading beam, and means for applying a second set of scanning signals to said second deflecting means whereby said reading beam produces second information signals in response to said second set of scanning signals.

7. The invention according to claim 6 with the addition of means coupled to said foraminous electrode for fixing the maximum excursion of said applied oscillatory wave at a predetermined level.

8. A signal conversion system, comprising a signal storage device including a target, means for producing a first electron beam adapted to land perpendicularly on a first side of said target, means for producing a second electron beam being adapted to land perpendicularly upon the second side of said target, said target containing a dielectric sheet having first and second surfaces, a conductive grid in contact with said first surface, a foraminous electrode spaced from said second surface, a source of an oscillatory wave, first and second electron discharge devices each having an input circuit and an output circuit, said output circuits being coupled together, transformer means coupled to said oscillatory wave source and to the input circuits of said first and second electron discharge devices, said transformer means being adapted to apply said oscillatory wave in opposite polarity to each of said input circuits, means for applying signals derived in accordance with means for producing first set of scanning standards to the input circuit of said first electron discharge device, said first and second electron discharge devices producing in the combined output circuit a voltage wave containing samples of said signals interspersed alternately by pulses of uniform amplitude, means for modulating said first electron beam by said voltage wave appearing in said combined output circuit, first means for deflecting said first electron beam in accordance with said first set of scanning standards, second means coupled to said source of said oscillatory wave for deflecting said first electron beam, said second deflecting means being adapted to impart a back and forth movement to said first electron beam as it is deflected laterally in response to said oscillatory wave, means coupled to said source of said oscillatory wave for applying said oscillatory wave to said foraminous electrode, means coupled to said foraminous electrode for establishing the maximum excursion of the oscillatory wave applied thereto at a fixed predetermined level, said foraminous electrode and said modulated first electron beam cooperating to write and erase as said first beam is correspondingly deflected back and forth, said writing and said erasing establishing a charge pattern on said target, third means for deflecting said second electron beam, and means for applying deflecting signals corresponding to a second set of scanning standards to said third deflecting means whereby said second electron beam scans said target to produce an output wave corresponding to said stored information in accordance with said second set of scanning standards.

References Cited in the file of this patent

UNITED STATES PATENTS

| | | |
|---|---|---|
| 2,547,638 | Gardner | Apr. 3, 1951 |
| 2,687,492 | Szegho et al. | Aug. 24, 1954 |